W. URQUHART & J. U. LIVINGSTON.
Pumps.

No. 149,171. Patented March 31, 1874.

WITNESSES.
A Bennewendorf.
Sidgwick

INVENTOR.
W. Urquhart
J. U. Livingston
BY
Munn
ATTORNEYS.

UNITED STATES PATENT OFFICE.

WILLIAM URQUHART AND JOHN U. LIVINGSTON, OF WEST HOBOKEN, N. J.

IMPROVEMENT IN PUMPS.

Specification forming part of Letters Patent No. 149,171, dated March 31, 1874; application filed January 31, 1874.

*To all whom it may concern:*

Be it known that we, WILLIAM URQUHART and JOHN U. LIVINGSTON, of West Hoboken, in the county of Hudson and State of New Jersey, have invented a new and Improved Pump, of which the following is a specification:

The invention will first be fully described, and then pointed out in claim.

Figure 1:
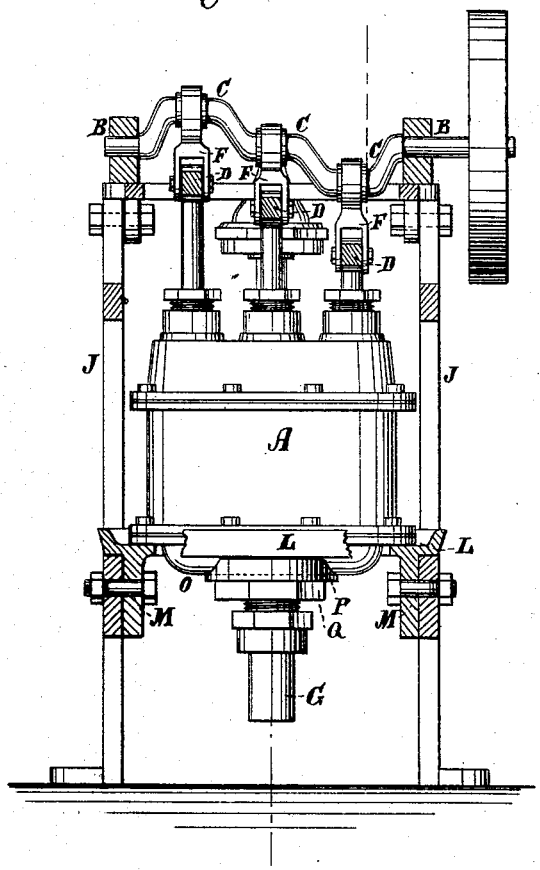
Figure 2:
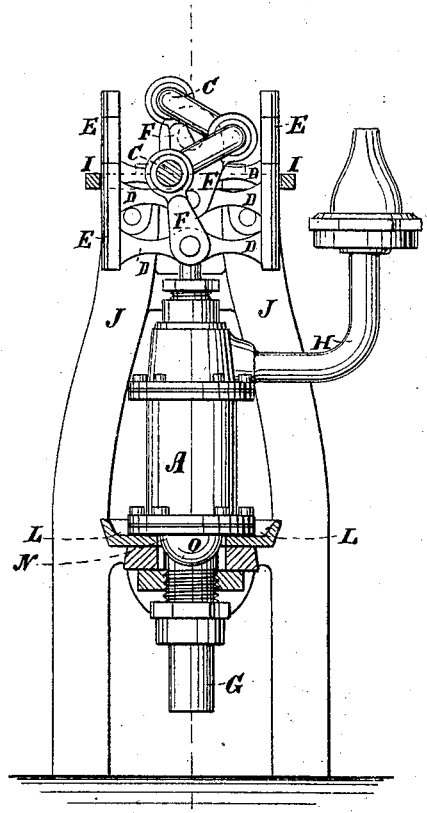
Figure 3:
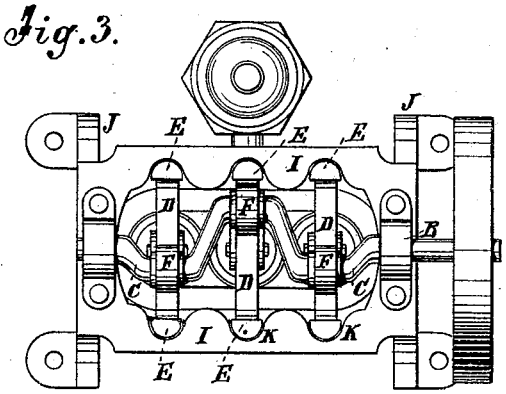

Figure 1 is a sectional elevation of the pump-frame and the cross-heads, taken on the line $x$ $x$ of Fig. 2; Fig. 2 is a sectional elevation, taken on the line $y$ $y$ of Fig. 3; and Fig. 3 is a top view.

Similar letters of reference indicate corresponding parts.

A represents three pump-cylinders, arranged side by side in a row, and preferably cast together. B represents a crank-shaft above, having a crank, C, for each pump, arranged one-third of a turn apart from each other, to work the pumps regularly in succession. D represents the cross-heads; E, slides; F, connecting-rods; G, suction-pipe, and H discharge-pipe.

The pumps may be double or single acting and of any approved kind; but it is essential that they all connect alike with the suction and discharge pipes.

For guides for the cross-heads, we arrange the bars I, which connect the two standards J of the frame together at the top at suitable distances apart, and provide them with notches K, for the slides E to work in; and, for supporting and attaching the pumps, we seat them on the lower connecting bar or plate L, which bolts to the standards at M, and has a space or slot, N, through which the suction-pipe G projects; also, the branches O, connecting the suction with the outside pumps, and fastens them by the washer P and nut Q, applied to the suction from below.

Having thus described our invention, we claim as new and desire to secure by Letters Patent—

The plate L, slotted and flanged as shown and described, to adapt it to be attached to standards J, and used as a seat for a pump-cylinder, in the manner set forth.

WM. URQUHART.
JOHN U. LIVINGSTON.

Witnesses:
T. B. MOSHER,
ALEX. F. ROBERTS.